United States Patent [19]

Nishimura et al.

[11] Patent Number: 5,500,463

[45] Date of Patent: Mar. 19, 1996

[54] AQUEOUS RESIN COMPOSITION AND METHOD FOR FORMING COATING FILM ON CAN BODY

[75] Inventors: Satoshi Nishimura, Sagamihara; Hidekimi Hirasawa, Kawasaki; Tamio Iimure, Omiya, all of Japan

[73] Assignee: Nippon Paint Co., Ltd., Osaka, Japan

[21] Appl. No.: 176,288

[22] Filed: Dec. 30, 1993

Related U.S. Application Data

[63] Continuation of Ser. No. 897,660, Jun. 11, 1992, abandoned, which is a continuation-in-part of Ser. No. 847,282, Mar. 10, 1992, abandoned.

[30] Foreign Application Priority Data

| Mar. 11, 1991 | [JP] | Japan | 3-069376 |
| Mar. 11, 1991 | [JP] | Japan | 3-069427 |
| Nov. 20, 1991 | [JP] | Japan | 3-329762 |

[51] Int. Cl.$^6$ .............................. C08K 3/20; C08L 63/02
[52] U.S. Cl. ........................... 523/408; 523/409; 525/108
[58] Field of Search ....................... 523/409, 408; 525/108

[56] References Cited

U.S. PATENT DOCUMENTS 4,423,165  12/1983  Harper et al. ......................... 523/409

FOREIGN PATENT DOCUMENTS

| 60-4753 | 2/1985 | Japan . |
| 61-092850 | 5/1986 | Japan . |
| 2-25784 | 6/1990 | Japan . |

*Primary Examiner*—Melvyn I. Marquis
*Assistant Examiner*—D. Aylward
*Attorney, Agent, or Firm*—Foley & Lardner

[57] ABSTRACT

Disclosed are an aqueous resin composition which comprises a material comprising an acrylic resin (A) having an acid value of 0 to 70 and an epoxy resin (B), which may be or may not be partially bound to each other, an acrylic resin (C) having an acid value of 100 to 500 which may be or may not be further partially bound to a bound product of (A) and (B) or to (B), and, if necessary, at least one of a resol type phenol resin and an amino resin (D) which may be or may not be previously condensed with at least one of (A), (B) (C) and a bound product thereof, and being dispersed in an aqueous solution containing a volatile base (E), and a method for forming a coating film on a can body using the above composition as an aqueous coating.

13 Claims, No Drawings

AQUEOUS RESIN COMPOSITION AND METHOD FOR FORMING COATING FILM ON CAN BODY

This application is a continuation of application Ser. No. 07/897,660, filed Jun. 11, 1992, abandoned, which is a continuation-in-part of application Ser. No. 07/847,282, filed Mar. 10, 1992, abandoned.

BACKGROUND OF THE INVENTION

1. Field of the Invention

This invention relates to an aqueous epoxy resin composition, more specifically it relates to an aqueous resin composition which is excellent in stability of an aqueous dispersion and processability, curability and corrosion resistance of a coated film, and is suitable for a metal can, particularly for inner surface coating of food cans and beverage cans excellent in flavor maintaining property.

2. Background Information

This invention also relates to a method for forming a coating film on an inner surface of a can body such as two-piece (2P) can used as cans for beverage or food, more specifically it relates to a method for forming a coating film of a can body excellent in adhesiveness and corrosion resistance, which is applicable with coatings of a pre-coat using an aqueous coating composition comprising an acryl-epoxy-acryl resin and a top coating layer.

A coating for a metallic can is required to be sufficiently durable to various conditions during working and commercial distribution of the metallic can and a content therein. It is also important to deal with various problems such as hygiene of working conditions and prevention of fire and explosion, and particularly important for beverage or food cans to satisfy the requirements on food hygiene. Thus, in recent years, an aqueous coating has widely been used.

In such a situation, an aqueous epoxy resin coating composition has been particularly attracted to attention due to its easiness in handling and various compositions have been proposed. For example, in Japanese Provisional Patent Publication No. 135260/1984 (which corresponds to U.S. Pat. No. 4,446,258 of Chu et al.), there is disclosed an aqueous resin composition in which an acrylic resin-modified epoxy resin having a high acid value and an acrylic resin containing no acidic group are dispersed in an amine aqueous solution.

However, these prior art aqueous epoxy resin compositions have problems that they are generally insufficient in dispersion stability, poor in processability or corrosion resistance, or low in flavor maintaining property.

In the aqueous dispersion coating composition of the prior art, when an acrylic resin having a low glass transition temperature is used in order to improve processability of a coated film, stability of aqueous dispersion lowered so that processability and stability of aqueous dispersion are imcompatible with each other.

On the other hand, a two-piece can has generally been used more widely than the conventional three-piece (3P) can since the former is inexpensive, high quality and beautiful. However, it has been produced by Draw & Ironing (hereinafter abbreviated to as "DI") processing using a tin plate or an aluminum plate as a raw material so that some problems, which should be solved, remain in coating of such a DI can.

Thus, In Japanese Patent Publication No. 4753/1985, there is disclosed a process for producing a highly corrosion resistant DI can comprising coating a paint for cans, containing at least one of an epoxy group, a hydroxyl group and a carboxyl group on a steel plate containing a metallic chromium layer and a hydrated chromium oxide layer, then subjecting to DI processing, coating once again and baking. Also, in Japanese Patent Publication No. 25784/1990, there is disclosed a coated steel plate for DI cans improved in adhesiveness and corrosion resistance, in which a steel plate subjected to specific plating and conversion treatment is coated with a thermoplastic polyester which is capable of orientating. Further, in Japanese Provisional Patent Publication No. 92850/1986, there is disclosed a coated steel plate for DI cans having excellent corrosion resistance, in which a steel plate subjected to specific conversion treatment is coated with a vinyl chloride series organo sol coating containing a resol type phenol resin.

However, each of the above prior art uses an organic solvent type coating so that they are not preferred in the point of fire, working environment and global environment. Further, they are not necessarily sufficient in interlaminar adhesiveness or high temperature resistance for sterilization.

SUMMARY OF THE INVENTION

In the present invention, an object of the present invention is to solve the above problems and to provide an aqueous resin composition which is excellent in both of processability and stability of aqueous dispersion, and also improved in curability, flavor maintaining property and corrosion resistance.

Another object of the present invention is to provide a method for forming a coating film excellent in interlaminar adhesiveness and corrosion resistance on an inner surface of a can body, even if necessary times for coatings are reduced, by effecting pre-coating with an aqueous coating which is favorable for circumferential environment.

In the present invention, the present inventors have found that by making a multilayered structure in which an acrylic resin having a low glass transition temperature and a low acid value is wrapped up in an epoxy resin and the outside thereof is surrounded by an acrylic resin having a high acid value, processability can be improved without impairing stability of aqueous dispersion, and by previously condensing a phenol resin and/or an amino resin, curability, flavor maintaining property and corrosion resistance can be improved.

The present invention is an aqueous resin composition which comprises a material comprising an acrylic resin (A) having an acid value of 0 to 70 and an epoxy resin (B), which may be or may not be partially bound to each other, and an acrylic resin (C) having an acid value of 100 to 500 which may be or may not be further partially bound to a bound product of (A) and (B) or to (B), being dispersed in an aqueous solution containing a volatile base (E).

An aqueous resin composition of the present invention further comprises a material comprising an acrylic resin (A) having an acid value of 0 to 70 and an epoxy resin (B), which may be or may not be partially bound to each other, an acrylic resin (C) having an acid value of 100 to 500 which may be or may not be further partially bound to a bound product of (A) and (B) or to (B), and at least one of a resol type phenol resin and an amino resin (D) which may be previously condensed with at least one of (A), (B), (C) and a bound product thereof, being dispersed in an aqueous solution containing a volatile base (E).

Also, a method for forming a coating film of the present invention comprises the steps of:

(I) subjecting to pre-coat coating of an aqueous coating comprising an acrylic resin (A) having an acid value of 0 to 70 and an epoxy resin (B), which may be or may not be partially bound to each other, and an acrylic resin (C) having an acid value of 100 to 500 which may be or may not be further partially bound to a bound product of (A) and (B) or to (B), and being dispersed in an aqueous solution containing (with) a volatile base (E), on the surface of a metal plate;

(II) curing a film of the above pre-coat coating;

(III) subjecting to plastic processing of the metal plate coated with the pre-coat coating by making the cured film inner surface to form a can body having a bottom;

(IV) subjecting to top-coat coating of an epoxy resin series aqueous coating or the above aqueous resin composition of the step (I) on the inner surface of the can body having a bottom; and (V) curing the above top-coat coating film.

DESCRIPTION OF THE PREFERRED EMBODIMENTS

In the following, the present invention will be explained in detail.

The acrylic resin (A) or (C) to be used in the present invention is a copolymer obtained by reacting an $\alpha,\beta$-unsaturated carboxylic acid and a monomer capable of copolymerizing with the former. As the $\alpha,\beta$-unsaturated carboxylic acid, there may be exemplified by an unsaturated monobasic acid such as acrylic acid and methacrylic acid, and an unsaturated dibasic acid such as maleic acid and fumaric acid, or a monoalkyl (1 to 12 carbon atoms) ester of the above.

As the copolymerizable monomer, there may be exemplified by an alkyl acrylate such as methyl acrylate, ethyl acrylate and butyl acrylate; an alkyl methacrylate such as methyl methacrylate, ethyl methacrylate and butyl methacrylate; a styrene series monomer such as styrene, vinyltoluene and chlorostyrene; a hydroxyl group-containing acrylic monomer such as 2-hydroxyethyl acrylate, 2-hydroxypropyl acrylate, 2-hydroxyethyl methacrylate and 2-hydroxypropyl methacrylate; an unsaturated dibasic dialkyl ester such as dimethyl maleate, dibutyl maleate, dimethyl fumarate and dibutyl fumarate; a vinyl ester such as vinyl acetate and vinyl lactate; an acrylamide such as dimethyl acrylamide and dimethyl methacrylamide; and acrylonitrile and methacrylonitrile.

The copolymerization reaction is generally carried out by reacting both monomers in an organic solvent using a free radical generating agent such as benzoyl peroxide or azo-bisisobutyronitrile as a polymerization initiator at a temperature of 80° to 150° C.

An acid value of the acrylic resin (A) having a low acid value is 70 or less, preferably 50 or less, more preferably 5 to 50. If it exceeds 70, multilayered structure cannot be obtained so that stability of aqueous dispersion becomes low. An acid value of the acrylic resin (C) having a high acid value is 100 to 500, more preferably 150 to 350. If the acid value is less than 100, dispersion stability in water, working resistance of a coated film, and flavor maintaining property depending on the use becomes poor, while it exceeds 500, corrosion resistance, hot water resistance and retort resistance becomes poor.

Number average molecular weights of the acrylic resins (A) and (C) are each preferably 3,000 to 80,000. If it is less than 3,000, working resistance, corrosion resistance and flavor maintaining property are lowered, while if it exceeds 80,000, a solid content at a suitable coating viscosity is lowered.

The epoxy resin (B) to be used in the present invention is an epoxy resin containing 40% or more, preferably 60% or more of a condensed unit of bisphenol A, F, B or a halogen-substituted bisphenol of the above bisphenols with epihalohydrin, and having a number average molecular weight of 1,000 or more, preferably 3,000 or more with one or more oxyrane ring at the terminal thereof, and it can be prepared according to the following method. Also, these epoxy resins may be used in a combination.

1. An epoxy resin obtained by the reaction of bisphenol A, F, B or a halogen-substituted bisphenol of the above bisphenols with epihalohydrin or $\beta$-methylepihalohydrin.

2. An epoxy resin obtained by the reaction of the epoxy resin mentioned in the above 1 with bisphenol A, F, B or a halogen-substituted bisphenol of the above bisphenols.

3. A modified epoxy resin obtained by the reaction of the epoxy resin mentioned in the above 1 or 2 with a dibasic acid such as phthalic acid (anhydride), maleic acid (anhydride) and adipic acid.

4. A modified epoxy resin obtained by the reaction of the epoxy resin mentioned in the above 1 or 2 with a monobasic acid such as acetic acid, butyric acid, benzoic acid, castor oil fatty acid, soybean oil fatty acid and tall oil fatty acid.

5. A modified epoxy resin obtained by the reaction of the epoxy resin mentioned in the above 1 or 2 with a polyester polyol obtained by the reaction of a (polyvalent) alcohol and a (poly)basic acid.

Here, examples of the polyvalent alcohol may include ethylene glycol, propylene glycol, 1,4-butanediol, 1,6-hexanediol and trimethylolpropane. Examples of the polybasic acid may include a dibasic acid such as phthalic acid (anhydride), maleic acid (anhydride), adipic acid, trimellitic acid, pyromellitic acid; and trimellitic acid anhydride and pyromellitic acid anhydride.

As the partial bond(s) forming method of the epoxy resin (B) and the acrylic resins (A) and (C), the following three methods can be employed.

1. A method in which an ester bond and/or a salt bond of the following formula (I) is formed by reacting an epoxy group of the epoxy resin and a carboxyl group of the acrylic resin using an amine as a catalyst and, if necessary, in the presence of water.

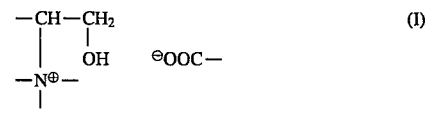

2. A method in which an ester bond is formed by reacting an $\alpha,\beta$-unsaturated acid with the epoxy resin and then polymerizing the product as one component of polymeric monomers with other copolymerizable monomer(s).

3. A method in which an acrylic polymerization is carried out in an epoxy resin solution to obtain an epoxy resin-grafted acrylic resin.

A weight ratio of solid components is preferably the acrylic resin (A) having a low acid value/the epoxy resin (B)/-the acrylic resin (C) having a high acid value of within (1 to 20)/(90 to 50)/(9 to 30). If a used ratio of the acrylic resin (A) having a low acid value is less than 1, modifying effect of a coated film such as improvement in processability cannot be admitted, while it exceeds 20, corrosion resistance is lowered. Also, if a used ratio of the acrylic resin (C) having a high acid value is less than 9, dispersion stability is lowered, while it exceeds 30, corrosion resistance, hot water resistance and retort resistance are lowered. More preferably, it is (5 to 15)/–(85 to 60)/(10 to 25), further preferably (5 to 10)/(85 to 70) / (10 to 20).

As the resol type phenol resin and/or amino resin (D) to be used in the present invention, there may be mentioned a resol type phenol resin obtained by reacting phenol, a phenol having an alkyl substituent with 1 to 12 carbon atoms, or bisphenol A, F or B with formaldehyde in the presence of an alkaline catalyst and/or an alkyl (1 to 8 carbon atoms) etherified product or allyl etherified product thereof. Also, as the amino resin, there may be mentioned an amino resin such as a partially methylated amino resin, a completely methylated amino resin, a partial butylated amino resin and a completely butylated amino resin; a urea resin such as a partially methylated urea resin and a completely methylated urea resin.

A weight ratio of solid components to be mixed is preferably the resol type phenol resin and/or amino resin (D)/–[the acrylic resins (A) and (C)+the epoxy resin (B)] of 0.5/100 to 50/100. If it is less than 0.5/100, improvement in corrosion resistance and adhesiveness of a coating film cannot be admitted, while it exceeds 50/100, flavor maintaining property is lowered. More preferably, it is 1/100 to 30/100.

When the acrylic resins (A) and (C), and the resol type phenol resin and/or amino resin (D) are previously condensed, the weight ratio of (D)/[(A)+(C)] is preferably in the range of 1/100 to 500/100 calculated on weights of solid components. If it less than 1/100, corrosion resistance of a coated film is lowered and the effect of previous condensation cannot be exhibited, while it exceeds 500/100, flavor maintaining property of a coated film is lowered. More preferably, it is 2/100 to 150/100.

Also, previous condensation of the epoxy resin (B) and the resol type phenol resin and/or amino resin (D) is preferably carried out in the weight ratio of 0.5/100 to 100/100 calculated on weights of solid components. If it less than 0.5/100, adhesiveness and corrosion resistance of a coated film are lowered and the effect of previous condensation cannot be exhibited, while it exceeds 100/100, flavor maintaining property of a coated film is lowered. More preferably, it is 1/100 to 50/100.

The weight ratio of [at least one of the resol type phenol resin and amino resin (D)]/[the epoxy resin (B)+the acrylic resins (A) and (C)] calculated on weights of solid components is preferably in the range of 0.5/100 to 100/– 100. If it is less than 0.5/100, adhesiveness of a coated film is lowered, while it exceeds 100/100, flavor maintaining property of a coated film is lowered. More preferably, it is 1/100 to 50/100.

The above previous condensation is carried out by reacting at 50° to 150° C. for 30 min to 5 hours.

The previous condensation can be carried out to the following component (s) and may be carried out in combination.

1. The epoxy resin alone.

2. Partial bound product of the epoxy resin and the acrylic resin having a low acid value.

3. Simultaneously with formation of partial binding(s) of the epoxy resin and the acrylic resin having a low acid value.

4. The acrylic resin having a low acid value.

5. Partial bound product of the epoxy resin, the acrylic resin having a low acid value and the acrylic resin having a high acid value.

6. Partial bound product in which the acrylic resin having a low acid value and the acrylic resin having a high acid value are simultaneously partially bound to the epoxy resin.

7. The acrylic resin having a high acid value.

Moreover, the aqueous resin composition of the present invention may have the following structures.

1. An acrylic resin having an acid value of 0 to 70 and a resol type phenol resin and/or amino resin are previously condensed, and then an epoxy resin, and an acrylic resin having an acid value of 100 to 500 are successively and partially reacted thereto.

2. A previously condensed product of a resol type phenol resin and/or an amino resin and an epoxy resin is reacted with an acrylic resin having an acid value of 0 to 70, and then an acrylic resin having an acid value of 100 to 500 is partially reacted thereto.

3. To a reaction product of an acrylic resin having an acid value of 0 to 70 and an epoxy resin are partially reacted a previously condensed product of an acrylic resin having an acid value of 100 to 500 and a resol type phenol resin and/or an amino resin.

4. To a previously condensed product of an acrylic resin having an acid value of 0 to 70 and a resol type phenol resin and/or an amino resin are partially reacted a previously condensed product of an epoxy resin and a resol type phenol resin and/or an amino resin, and then an acrylic resin having an acid value of 100 to 500 is partially reacted thereto.

5. An acrylic resin having an acid value of 0 to 70 and a resol type phenol resin and/or an amino resin are previously condensed, and then an epoxy resin, and a previously condensed product of an acrylic resin having an acid value of 100 to 500 and a resol type phenol resin and/or an amino resin are successively and partially reacted thereto.

6. A previously condensed product of a resol type phenol resin and/or an amino resin and an epoxy resin is reacted with an acrylic resin having an acid value of 0 to 70, and then a previously condensed product of an acrylic resin having an acid value of 100 to 500 and a resol type phenol resin and/or an amino resin is partially reacted thereto.

7. An acrylic resin having an acid value of 0 to 70, an epoxy resin, and a resol type phenol resin and/or an amino resin are simultaneously reacted with each other, and then an acrylic resin having an acid value of 100 to 500 is partially reacted thereto.

8. To a reaction product of an acrylic resin having an acid value of 0 to 70 and an epoxy resin is/are previously condensed a resol type phenol resin and/or an amino resin, and further an acrylic resin having an acid value of 100 to 500 is partially reacted thereto.

9. An acrylic resin having an acid value of 0 to 70 and a resol type phenol resin and/or an amino resin are previously condensed, then a previously condensed product of an epoxy resin and a resol type phenol resin and/or an amino resin, and a previously condensed product of an acrylic resin having an acid value of 100 to 500 and a resol type phenol resin and/or an amino resin are successively and partially reacted thereto.

10. To a partial reaction product of an acrylic resin having an acid value of 0 to 70 and an epoxy resin are simultaneously reacted an acrylic resin having an acid value of 100 to 500, and a resol type phenol resin and/or an amino resin.

An aqueous coating comprising emulsion particles having three-layered structure of acryl-epoxy-acryl obtained as mentioned above can be used as at least a pre-coating whereby the object of the present invention can be accomplished. When it is used as a top-coating, the composition of which may be the same as those used in the pre-coating or may be different within the above composition range.

In the preparation of the aqueous resin composition of the present invention, an organic solvent which is capable of dissolving the acrylic resins (A) and (C) (hereinafter referred to those including a material which is previously condensed with the resol type phenol resin and/or amino resin) and the epoxy resin (B) (hereinafter referred to those including a material which is previously condensed with the resol type phenol resin and/or amino resin). Examples of the solvents to be generally used include an alcohol such as isopropanol, butanol, 2-ethylhexanol and cyclohexanol; a glycol such as ethylene glycol, diethylene glycol and 1,3-butylene glycol; a glycol ether such as ethyleneglycol monomethyl ether and ethyleneglycol monobutyl ether; a glycol ether ester such as ethyleneglycol ethyl ether acetate and ethyleneglycol methyl ether propionate; a ketone such as methyl isobutyl ketone and cyclohexanone; an aromatic hydrocarbon such as toluene and xylene; and a mixture of the above solvents.

However, an amount of the organic solvent to be used for dissolving the epoxy resin (B) and the acrylic resins (A) and (C) is preferably made as little as possible in the range of causing any trouble in handling operations. If necessary, the solvent may be removed under normal pressure or reduced pressure from the aqueous resin dispersion. The final content of the organic solvent in the aqueous resin dispersion is preferably 20% by weight or less.

In the aqueous resin dispersion of the present invention, a carboxyl group of the acrylic resin (C) having a high acid value forms a quaternary ammonium salt in an aqueous solution which was made a pH of 5 to 11 by adding a volatile base (E) to provide water dispersibility.

As the volatile base (E), there may be mentioned ammonia; an alkylamine such as methylamine, dimethylamine, trimethylamine, ethylamine, diethylamine, triethylamine, butylamine, dibutylamine and tributylamine; an aminoalcohol such as ethanolamine, methylethanolamine and dimethylethanolamine; and a cyclic amine such as morpholine. Among these, a tertiary amine is particularly preferred.

As the dispersing method to the volatile base (E) aqueous solution, there may be used the following methods.

1. After adding a necessary amount of the volatile base to a mixture containing all of the resins obtained, the mixture is charged in water and dispersed therein, or water is added to the mixture and the mixture is dispersed.

2. A necessary amount of a mixed solution containing water and the volatile base is added to a mixture containing all 10 of the resins obtained, and dispersed.

3. A mixture containing all of the resins obtained is added to a necessary amount of a mixed solution containing water and the volatile base, and dispersed.

4. After adding a necessary amount of the volatile base to the acrylic resin having a high acid value, the mixture is charged in water or water is charged in the mixture to disperse the mixture, and the remaining resins are added to the dispersion and the whole components are dispersed therein.

5. After adding a necessary amount of a mixture containing water and the volatile base to the acrylic resin having a high acid value and dispersed therein, and the remaining resins are added to the dispersion and the whole components are dispersed therein.

6. A necessary amount of the volatile base is added to the acrylic resin having a high acid value to which the phenol resin and/or amino resin is/are previously condensed or not condensed, then the mixture is charged in water or water is charged in the mixture to disperse the mixture, and then the remaining resins are added to the dispersion and the whole components are dispersed therein.

7. A necessary amount of a mixture of water and the volatile base is added to the acrylic resin having a high acid value to which the phenol resin and/or amino resin is/are previously condensed or not condensed, and then the remaining resins are added to the dispersion and the whole components are dispersed therein. Or else, the dispersion is added to the remaining resins to disperse the mixture therewith.

8. To a necessary amount of a mixture of water and the volatile base is added the acrylic resin having a high acid value to which the phenol resin and/or amino resin is/are previously condensed or not condensed, and then the remaining resins are added to the dispersion and the whole components are dispersed therein. Or else, the dispersion is added to the remaining resins to disperse the mixture therewith.

The composition of the aqueous resin composition is preferably a resin solid content of 10 to 40% by weight, an organic solvent of 0 to 20% by weight and water of 90 to 40% by weight.

The aqueous resin composition of the present invention may further contain, if necessary, a phenol resin and/or a melamine resin, an amino resin such as a urea resin, and a curing catalyst such as p-toluenesulfonic acid to form an aqueous dispersion. Examples of the melamine resin to be used may include a partially methylated melamine resin, a completely methylated melamine resin, a partial butylated melamine resin and a completely butylated melamine resin. Also, examples of the urea resin may include a partially methylated urea resin and a completely methylated urea resin, and examples of the phenol resin may include a resol type or a novolak type phenol resin obtained from phenol, an alkyl phenol, bisphenol A, F or B, or a halogen-substituted phenol of the above, or an alkyl (1 to 8 carbon atoms) etherified resin or an allyl etherified resin.

The aqueous resin composition of the present invention may be used as an aqueous coating composition such as anti-corrosive primer or anti-corrosive coatings, or an aqueous printing ink by adding an anti-corrosive agent, a pigment or a filler suitable for the use in an amount which does not impair the characteristics of the composition.

By using the anti-corrosive agent and/or the pigment, corrosion resistance of a coating film can be improved or beauty appearance of a coating film can be provided. An amount of these components is preferably 30% by weight or less, more preferably 20% by weight or less based on the total composition. As a basic anti-corrosive pigment, there may be mentioned a lead type pigment such as red lead oxide, lead suboxide, lead cyanamide and basic lead chromate; and a boric acid type pigment such as barium metaborate, calcium borate and zinc borate; and as the other pigments, there may be mentioned a chromic acid type pigment such as zinc chromate and strontium chromate; a molybdic acid type pigment such as zinc molybdate and calcium molybdate; a tungstic acid type pigment; a phosphoric acid type pigment such as zinc phosphate and aluminum phosphate; an organic metal salt type pigment such as a zinc salt of an organic nitro compound; and a phosphite type pigment. As a metallic soap-forming anti-corrosive pigment, there may be mentioned a lead type, alkaline earth metal type and zinc type pigments. Also, as a corrosive pigment having a shape of pigment particle, there may be mentioned, for example, mica-shaped iron oxide. These pigments may be used singly or in combination of two or more.

As a substrate to be coated by the aqueous resin composition of the present invention, there may be mentioned, for example, a metal such as a steel plate, an aluminum plate, a plated steel plate in which single or plural number of metals such as zinc, tin, chromium, nickel and aluminum are plated on the surface of a steel plate, a plate in which the surface of the above plated steel plate is chemically treated with chromic acid or phosphoric acid, or subjected to electrolytic treatment, and further a paper and a wood. As a coating method, conventionally known methods can be utilized. That is, there may be used air spraying, airless spraying, roll coating, electrodeposition, dip coating and brushing.

Examples of the top-coat coating to be used in the method of the present invention include the above aqueous coatings and/or a well known epoxy type aqueous coating such as an acrylic resin-modified epoxy resin aqueous coating, a polyester-modified epoxy resin aqueous coating, a polybasic acid-modified epoxy resin composition and a phosphoric acid-modified epoxy resin aqueous coating.

If necessary, the resol type phenol resin and/or amino resin (D) may be formulated and/or previously condensed to the above resin.

In the aqueous coating or the epoxy resin type aqueous coating to be used in the method of the present invention, a curing catalyst such as p-toluenesulfonic acid may be added, if necessary.

Also, to these coatings, if necessary, a colored pigment, an anti-corrosive pigment, an extender pigment, a defoaming agent or a surface tension controller may be added. To the pre-coat coating may be added a lubricant such as an aliphatic acid ester, wax and other polymer compound.

As the coating method for the pre-coat coating, well known methods such as roll coater, spraying, flow coater, dipping coating and electrodeposition coating may be used, and for the top-coat coating, spraying is preferably used.

A thickness of the coating film is preferably 0.5 to 10 µm, more preferably 1 to 3 µm in the pre-coat and preferably 1 to 20 µm, more preferably 3 to 15 µm in the top-coat.

Curing of these coatings may be carried out in a hot air drying oven, an infrared heating oven, a high-frequency induction heating oven and the like singly or in combination of two or more.

Curing of the coated film may be carried out by drying at normal temperature, but preferably by compulsory drying at a temperature range of 80° to 350° C. for 10 sec to 30 min.

In the step of forming a can body having a bottom from the coated metal plate by plastic processing of the method of the present invention, the conventionally known DI method, DRD (Draw & Redraw) method, DRS (Draw & Redraw Stretch) method or impact method may be used, and also necking processing may be applied.

In the DI method, after cutting the coated metal plate to the shape of a circular plate, it is molded to a cup-shape by drawing and then molding to a predetermined can body by ironing.

The DRD method is carried out by cutting the coated metal plate to the shape of a circular plate, molding it to a cup-shape by drawing and then repeating the drawing to form a predetermined shape of can body.

The DRS method is carried out by cutting the coated metal plate to the shape of a circular plate, molding it to a cup-shape by drawing and then subjecting to stretching of a can wall while subjecting to drawing again, to form a predetermined shape of can body.

The impact method is carried out by abruptly applying a pressure in the cold according to impact extrusion press whereby the raw material is subjected to flow of plasticity into a gap between a punch and a die to form a predetermined shape of can body.

As a raw material of a metal plate to be coated, a sheet-shaped or a coil-shaped material as mentioned below may be used.

(1) An alloy of at least one of a metal such as aluminum, copper, manganese, silicon, magnesium and zinc, with aluminum.

(2) A steel plate or a plated steel plate on which at least one metal such as zinc, tin, chromium, nickel and aluminum is plated.

(3) A plate in which the plate of the above (1) or (2) is chemically treated with chromic acid or phosphoric acid, electrolytically treated or plated.

After DI processing, usual alkali defatting or acidic defatting is carried out followed by washing with water, draining off the water and drying, top-coat coating can be carried out by spraying. Also, after defatting, chemical treatment with chromic acid or phosphoric acid, or electrolytically treatment is subjected to, followed by washing with water, draining off the water and drying are carried out, and inner surface spray coating may carried out.

The aqueous resin composition of the present invention is dissolved or dispersed to a solvent or a dispersant according as the purpose and use to obtain a paint, lacquer or coating solution which is generally called "coating composition", and then the dissolved or dispersed coating composition is coated on a substrate to form a film. As a result, the coated article comprising the coating composition of the present invention can be obtained.

The aqueous coating to be used in the method of the present invention has extremely excellent adhesiveness to a metal plate base as a pre-coat, and the epoxy resin type aqueous coating as a top-coat has a similar coating composition with compatible of the precoating composition so that drape therebetween is good and covering can be carried out with less coating amount and interlaminar adhesiveness is extremely good.

The aqueous resin composition of the present invention is to improve processability thereof without impairing dispersion stability by making a multilayer structure comprising an acrylic resin (C) having a low acid value/an epoxy resin/an acrylic resin (A) having a high acid value from the inside to contain a material having low glass transition temperature inside thereof. Further, by previously condensing a phenol resin and/or an amino resin (D) to the above multilayer structure, curability, flavor maintaining property and corrosion resistance can be improved, and thus, the aqueous resin composition of the present invention can be used favorably as an inner surface coating for beverage cans.

EXAMPLES

In the following, the present invention is described in detail but the scope of the present invention is not limited by these. All parts and % each show part(s) by weight and % by weight, respectively.

Synthesis Example 1

Synthesis of High acid Value Acrylic Resin

In a flask replaced with nitrogen was charged a quarter of a mixture comprising 240 parts of styrene, 180 parts of ethyl acrylate, 358 parts of methacrylic acid, 170 parts of butyl cellosolve, 300 parts of n-butanol and 15 parts of benzoyl peroxide and the mixture was heated to 80° to 90° C., and the remaining three quarters of the mixture was gradually added dropwise at the same temperature over 4 hours. Then, a mixture of 2 parts of benzoyl peroxide and 50 parts of butyl cellosolve was gradually added dropwise over 30 minutes. After completion of the dropwise addition, the mixture was stirred for further 2 hours at the same temperature to obtain a high acid value acrylic resin solution having a solid component of 60% and a solid component acid value of 300.

Synthesis Example 2

Synthesis of High Acid Value Acrylic Resin

In a flask replaced with nitrogen was charged a quarter of a mixture comprising 667 parts of monobutyl maleate, 330 parts of styrene, 90 parts of 2-hydroxyethyl methacrylate, 175 parts of butyl cellosolve, 500 parts of n-butanol and 21 parts of azobisisobutyronitrile and the mixture was heated to 120° to 130° C., and the remaining three quarters of the mixture was gradually added dropwise at the same temperature over 2 hours. Then, a mixture of 3 parts of azobisisobutyronitrile and 50 parts of butyl cellosolve was gradually added dropwise over 30 minutes. After completion of the dropwise addition, the mixture was stirred for further 2 hours at the same temperature to obtain a high acid value acrylic resin solution having a solid component of 60% and a solid component acid value of 200.

Synthesis Example 3

Synthesis of Low Acid Value Acrylic Resin

In a flask replaced with nitrogen was charged a quarter of a mixture comprising 240 parts of styrene, 528 parts of 2-ethylhexyl acrylate, 10 parts of acrylic acid, 219 parts of butyl cellosolve, 300 parts of n-butanol and 15 parts of benzoyl peroxide and the mixture was heated to 80° to 90° C., and the remaining three quarters of the mixture was gradually added dropwise at the same temperature over 2 hours. Then, a mixture of 2 parts of benzoyl peroxide and 50 parts of butyl cellosolve was gradually added dropwise over 30 minutes. After completion of the dropwise addition, the mixture was stirred for further 2 hours at the same temperature to obtain a low acid value acrylic resin solution having a solid component of 60% and a solid component acid value of 10.

Synthesis Example 4

Synthesis of Low Acid Value Acrylic Resin

In a flask replaced with nitrogen was charged a quarter of a mixture comprising 50 parts of monobutyl maleate, 400 parts of styrene, 300 parts of 2-hydroxypropyl acrylate, 337 parts of 2-ethylhexyl acrylate, 175 parts of butyl cellosolve, 500 parts of n-butanol and 21 parts of azobisisobutyronitrile and the mixture was heated to 120° to 130° C., and the remaining three quarters of the mixture was gradually added dropwise at the same temperature over 2 hours. Then, a mixture of 3 parts of azobisisobutyronitrile and 50 parts of butyl cellosolve was gradually added dropwise over 30 minutes. After completion of the dropwise addition, the mixture was stirred for further 2 hours at the same temperature to obtain a low acid value acrylic resin solution having a solid component of 60% and a solid component acid value of 15.

Synthesis Example 5

Synthesis of Epoxy Resin

In a flask were charged 500 parts of an epoxy resin "Epikote 1009" (trade name, epoxy equivalent: 3100, available from Shell Chemical), 133 parts of butyl cellosolve and 200 parts of cellosolve acetate, and the mixture was dissolved under stirring at 120° C. to obtain an epoxy resin solution having a solid component of 60%.

Synthesis Example 6

Synthesis of Epoxy Resin

In a flask were charged 500 parts of an epoxy resin "Epikote 1007" (trade name, epoxy equivalent: 2400, available from Shell Chemical), 7.6 parts of adipic acid, 1 part of tri(n-butyl)amine and 338 parts of cellosolve acetate, and the mixture was reacted at 120° C. for 5 hours to obtain an epoxy resin solution having a solid component of 60% and a solid component acid value of 0.2.

Synthesis Example 7

Synthesis of Resol Type Phenol Resin

Carbolic acid (phenol) (94 parts), 37% formalin (405 parts) and 25% sodium hydroxide aqueous solution (211 parts) were mixed and reacted at 50° C. for 2 hours. After neutralizing with hydrochloric acid, the mixture was extracted with a mixed solution of ethyl acetate/n-butanol =1/1 to obtain a resol type phenol resin solution having a solid component of 80%.

Synthesis Example 8

Synthesis of Allylated Resol Type Phenol Resin

The reaction was carried out in the same composition ratio and the same conditions as in Synthesis Example 7, and then 80 parts of allyl chloride was added to the resin solution. The mixture was reacted at the same temperature for one hour and then treated in the same manner as in Synthesis example 7 to obtain an allylated resol type phenol resin having a solid component of 80%.

Synthesis Examples 9 to 13

Synthesis of Low Acid Value Acrylic Acid

In a flask replaced with nitrogen was charged each of a quarter of a mixture having the composition shown in Table 1 and the mixture was heated to 80° to 90° C., and the remaining three quarters were gradually added dropwise at the same temperature over 2 hours. Then, a mixture of 2 parts of benzoyl peroxide and 50 parts of butyl cellosolve was gradually added dropwise over 30 minutes. After completion of the dropwise addition, the mixture was stirred for further 2 hours at the same temperature to obtain low acid value acrylic resin solutions having a solid component and a solid component acid value as shown in Table 1, respectively.

TABLE 1

| Composition | Synthesis example | | | | |
|---|---|---|---|---|---|
| | 9 | 10 | 11 | 12 | 13 |
| Styrene | 297 | 290 | 260 | 250 | 245 |
| Butyl methacrylate | 78 | 78 | 78 | 78 | 78 |
| 2-Ethylhexyl acrylate | 400 | 400 | 400 | 400 | 400 |
| Acrylic acid | 3 | 10 | 40 | 50 | 55 |
| n-Butanol | 160 | 160 | 160 | 160 | 160 |
| Cellosolve acetate | 350 | 350 | 350 | 350 | 350 |
| Benzoyl peroxide | 15 | 15 | 15 | 15 | 15 |
| Solid component (%) | 60 | 60 | 60 | 60 | 60 |
| Solid component acid value | 3 | 10 | 30 | 70 | 75 |

Synthesis Examples 14 to 18

Synthesis of High Acid Value Acrylic Acid

In a flask replaced with nitrogen was charged each of a quarter of a mixture having the composition shown in Table 2 and the mixture was heated to 80° to 90° C., and the remaining three quarters were gradually added dropwise at the same temperature over 2 hours. Then, a mixture of 2 parts of benzoyl peroxide and 50 parts of methyl isobutyl ketone was gradually added dropwise over 30 minutes. After completion of the dropwise addition, the mixture was stirred for further 2 hours at the same temperature to obtain high acid value acrylic resin solutions having a solid component and a solid component acid value as shown in Table 2, respectively.

TABLE 2

| Composition | Synthesis example | | | | |
|---|---|---|---|---|---|
| | 14 | 15 | 16 | 17 | 18 |
| Styrene | 559 | 529 | 349 | 170 | 100 |
| Butyl methacrylate | 129 | 129 | 129 | 129 | 129 |
| Acrylic acid | 90 | 120 | 300 | 479 | 549 |
| n-Butanol | 260 | 260 | 260 | 260 | 260 |
| Methyl isobutyl ketone | 250 | 250 | 250 | 250 | 250 |
| Benzoyl peroxide | 15 | 15 | 15 | 15 | 15 |
| Solid component (%) | 60 | 60 | 60 | 60 | 60 |
| Solid component acid value | 90 | 120 | 300 | 480 | 550 |

Synthesis Example 19

Synthesis of Epoxy Resin-Bound Acrylic Monomer

In a flask were charged 1,440 parts of an epoxy resin "Epikote 1007" (trade name) and 970 parts of cellosolve acetate and uniformly dissolved at 130° C. Then, 1 part of dimethylethanolamine and 17 parts of methacrylic acid were added to the solution and the mixture was stirred at the same temperature for 4 hours to obtain an epoxy resin-bound acrylic monomer solution having an acid value of 0.1.

Synthesis Example 20

Synthesis of Epoxy Resin-Bound Acrylic Resin

In a flask was charged 450 parts of n-butanol, and a mixture of 240 parts of styrene, 180 parts of 2-ethylhexyl acrylate, 300 parts of methyl acrylate, 500 parts of the epoxy resin-bound acrylic monomer solution obtained in Synthesis example 19 and 15 parts of benzoyl peroxide was gradually added dropwise at 80° to 90° C. over 3 hours. Then, a mixture of 2 parts of benzoyl peroxide and 30 parts of n-butanol was gradually added dropwise at the same temperature over 30 minutes. Stirring was continued for further 2 hours at the same temperature to obtain an epoxy resin-bound acrylic resin solution having a solid component of 60%.

Synthesis Example 21

Synthesis of Epoxy Resin-Bound Acrylic Resin

In a flask were charged 480 parts of "Epikote 1007" (trade name) and 750 parts of cellosolve acetate and uniformly dissolved at 110° C. Then, a mixture of 240 parts of styrene, 480 parts of butyl acrylate and 30 parts of benzoyl peroxide was gradually added dropwise over 2 hours. Then, a mixture of 3 parts of benzoyl peroxide and 50 parts of cellosolve acetate was gradually added dropwise at the same temperature over 30 minutes. Stirring was continued for further 2 hours at the same temperature to obtain an epoxy resin-bound acrylic resin solution having a solid component of 60%.

EXAMPLE 1

In a flask were charged 333 parts of the low acid value acrylic resin solution obtained in Synthesis Example 4 and 100 parts of the resol type phenol resin solution obtained in Synthesis Example 7, and the mixture was stirred at 100° C. for 3 hours. The product can be confirmed to be previously condensed by measuring a molecular weight using Gel Permeation Chromatography (GPC). Then, 1000 parts of the epoxy resin solution obtained in Synthesis Example 5 and 18 parts of tri(n-butyl)amine were further charged therein and the mixture was stirred at 100° C. for 2 hours. After an acid value thereof was confirmed to be 0.2, a low acid value acrylic resin-previously condensed epoxy resin solution was obtained. To the solution was added 333 parts of the high acid value acrylic resin solution obtained in Synthesis Example 1 and the mixture was further stirred at 100° C. for one hour. After cooling to 80° C., 1716 parts of deionized water and 100 parts of tri(n-butyl)amine were added thereto, and the mixture was stirred for 30 minutes to obtain an aqueous resin composition having a solid component of 30%, a pH of 7.0 and a viscosity of 1020 cps (at 25° C., hereinafter the same).

Comparative Example 1

In a flask were charged 333 parts of the low acid value acrylic resin solution obtained in Synthesis Example 4, 1000 parts of the epoxy resin solution obtained in Synthesis example 5 and 18 parts of tri (n-butyl)amine, and the mixture was stirred at 100° C. for 2 hours. After confirming an acid value being 0.2, a low acid value acrylic resin-bound epoxy resin solution was obtained. To the solution was added 333 parts of the high acid value acrylic resin solution obtained in Synthesis Example 1 and the mixture was further stirred at 100° C. for one hour. After cooling to 80° C., 1716 parts of deionized water and 100 parts of tri (n-butyl)amine were added thereto, and the mixture was stirred for 30 minutes to obtain an aqueous resin composition having a solid component of 30%, a pH of 7.6 and a viscosity of 1350 cps.

Comparative Example 2

In a flask were charged 333 parts of the high acid value acrylic resin solution obtained in Synthesis Example 2 and 100 parts of the allylated resol type phenol resin solution obtained in Synthesis Example 8, and the mixture was stirred at 100° C. for 2 hours. The mixture can be confirmed to be previously condensed by measuring a molecular weight using GPC. To the mixture were added 1000 parts of the epoxy resin solution obtained in Synthesis Example 5, 42 parts of dimethylethanolamine and 200 parts of deionized water, and the mixture was further stirred at 80° C. for one hour. Thereafter, 1258 parts of deionized water was added thereto, and the mixture was stirred for 30 minutes to obtain an aqueous resin composition having a solid component of 30%, a pH of 6.0 and a viscosity of 1040 cps.

EXAMPLE 2

In a flask were charged 83 parts of the low acid value acrylic resin solution obtained in Synthesis Example 3, 1333 parts of the epoxy resin obtained in Synthesis Example 5 and 52 parts of dimethylethanolamine, and the mixture was stirred at 110° C. for 3 hours. After confirming an acid value being 0.2, an acrylic resin-bound epoxy resin solution was obtained. On the other hand, in another flask were charged 417 parts of the high acid value acrylic resin obtained in Synthesis Example 2 and 80 parts of the allylated resol type phenol resin solution and the mixture was stirred at 100° C. for 2 hours to obtain an allylated resol type phenol resin previously condensed-high acid value acrylic resin solution. The solution can be confirmed to be previously condensed by measuring a molecular weight using GPC. To the above acrylic resin-bound epoxy resin solution were added whole amount of the allylated resol type phenol resin previously condensed-high acid value acrylic resin solution and 200 parts of deionized water, and the mixture was further stirred at 80° C. for one hour. Thereafter, 1715 parts of deionized water was added thereto, and the mixture was stirred for 30 minutes to obtain an aqueous resin composition having a solid component of 30%, a pH of 7.2 and a viscosity of 850 cps.

EXAMPLE 3

In a flask were charged 1167 parts of the epoxy resin solution obtained in Synthesis Example 6 and 100 parts of the resol type phenol resin solution obtained in Synthesis example 7, and the mixture was stirred at 100° C. for 3 hours to obtain a resol type phenol resin-previously condensed epoxy resin solution. The resulting solution can be confirmed to be previously condensed by measuring a molecular weight using GPC. Then, to the solution were added 167 parts of the low acid value acrylic resin solution obtained in Synthesis Example 3 and 62 parts of dimethylethanolamine, and the mixture was further stirred at 100° C. for 2 hours. After confirming an acid value being 0.2, 333 parts of the high acid value acrylic resin solution obtained in Synthesis Example 1 and 200 parts of deionized water were added thereto, and the mixture was stirred at 80° C. for one hour. Thereafter, 1571 parts of deionized water was added thereto, to obtain an aqueous resin composition having a solid component of 30%, a pH of 6.5 and a viscosity of 1300 cps.

EXAMPLE 4

In a flask were charged 1000 parts of the epoxy resin solution obtained in Synthesis Example 5 and 70 parts of the resol type phenol resin solution obtained in Synthesis example 7, and the mixture was stirred at 100° C. for 3 hours to obtain a resol type phenol resin-previously condensed epoxy resin solution. The resulting solution can be confirmed to be previously condensed by measuring a molecular weight using GPC.

On the other hand, in another flask were charged 167 parts of the low acid value acrylic resin solution obtained in Synthesis Example 4 and 10 parts of the resol type phenol resin solution obtained in Synthesis Example 7, and the mixture was stirred at 100° C. for 3 hours to obtain a resol type phenol resin-previously condensed low acid value acrylic resin solution. The resulting solution can be confirmed to be previously condensed by measuring a molecular weight using GPC. To the resol type phenol resin-previously condensed epoxy resin solution were added whole amount of the resulting solution and 20 parts of tro(n-butyl)amine, and the mixture was stirred at 100° C. for 2 hours. After confirming an acid value being 0.2, a resol type phenol resin-previously condensed low acid value acrylic resin bound-epoxy resin solution was obtained.

To the resulting solution were added 417 parts of the high acid value acrylic resin solution obtained in Synthesis example 1, 128 parts of tri(n-butyl)amine and 200 parts of deionized water, and the mixture was stirred at 80° C. for one hour. Thereafter, 1368 parts of deionized water was further added thereto and the mixture was stirred for 30 minutes to obtain an aqueous resin composition having a solid component of 30%, a pH of 6.4 and a viscosity of 680 cps.

EXAMPLE 5

In a flask were charged 417 parts of the high acid value acrylic resin solution obtained in Synthesis Example 2 and 20 parts of the allylated resol type phenol resin solution obtained in Synthesis Example 8, and the mixture was stirred at 100° C. for 3 hours. The resulting solution can be confirmed to be previously condensed by measuring a molecular weight using GPC. Then, 1267 parts of the resol type phenol resin-previously condensed low acid value acrylic resin-bound epoxy resin solution obtained in Example 6, 200 parts of deionized water and 48 parts of dimethylaminoethanol were added thereto, and the mixture was stirred at 80° C. for one hour. Thereafter, 1481 parts of deionized water was added thereto and the mixture was stirred for 30 minutes, to obtain an aqueous resin composition having a solid component of 30%, a pH of 7.9 and a viscosity of 650 cps.

EXAMPLES 6 TO 9

In a flask were charged 1250 parts of the epoxy resin solution obtained in Synthesis Example 5 and 100 parts of the resol type phenol resin solution obtained in Synthesis example 7, and the mixture was stirred at 100° C. for three hours. The resulting solution can be confirmed to be previously condensed by measuring a molecular weight using GPC. Then, to the solution were added 133 parts of the low acid value acrylic resin solution obtained in any one of Synthesis Example 9, 10, 11 or 12 and 48 parts of dimethylethanol amine, and the mixture was stirred at 100° C. for 3 hours. Subsequently, 283 parts of the high acid value acrylic resin solution and 200 parts of deionized water were charged therein, and the mixture was stirred at 80° C. for one hour. Thereafter, 1586 parts of deionized water was added thereto and the mixture was stirred for 30 minutes, to obtain aqueous resin compositions each having a solid component of 30%, a pH of 6.1 to 7.9 and a viscosity of 530 to 1240 cps, respectively.

Comparative Example 3

In the same manner as in Examples 6 to 9 except for using the same amount of the low acid value acrylic resin solution obtained in Synthesis Example 13 in place of those obtained in Synthesis Example 9, 10, 11 or 12, an aqueous resin composition having a solid component of 30%, a pH of 7.4 and a viscosity of 1110 cps was obtained.

EXAMPLES 10 TO 12

In a flask were charged 1250 parts of the epoxy resin solution obtained in Synthesis Example 5 and 100 parts of the resol type phenol resin solution obtained in Synthesis example 7, and the mixture was stirred at 100° C. for 3 hours. The resulting solution can be confirmed to be previously condensed by measuring a molecular weight using GPC. Then, to the solution were added 133 parts of the low acid value acrylic resin solution obtained in Synthesis Example 4 and tri(n-butyl)amine with an amount as shown in Table 3, and the mixture was stirred at 100° C. for 2 hours. After confirming an acid value being 0.2, to the mixture were added 283 parts of the high acid value acrylic resin solution obtained in any one of Synthesis Examples 15, 16 or 17, and 200 parts of deionized water, and the mixture was stirred at 80° C. for one hour. Thereafter, deionized water with an amount as shown in Table 3 was added thereto and the mixture was stirred for 30 minutes, to obtain aqueous resin compositions each having a solid component of 30%, a pH of 6.4 to 7.3 and a viscosity of 680 to 1110 cps, respectively.

Comparative Examples 4 and 5

In the same manner as in Examples 10 to 12 except for using the same amount of the low acid value acrylic resin solution obtained in Synthesis Example 14 or 18, in place of those obtained in Synthesis Example 15, 16 or 17, aqueous resin compositions were obtained.

TABLE 3

|  | Comparative example | Example | | | Comparative example |
| --- | --- | --- | --- | --- | --- |
|  | 4 | 10 | 11 | 12 | 5 |
| Dimethylethanol amine | 15 | 20 | 51 | 81 | 93 |
| High acid value acrylic resin solution (Synthesis example No.) | 14 | 15 | 16 | 17 | 18 |
| Deionized water | 1619 | 1614 | 1583 | 1553 | 1541 |

EXAMPLE 13

In a flask were charged 500 parts of the high acid value acrylic resin solution obtained in Synthesis Example 2 and 80 parts of hexamethoxymethylmelamine, and the mixture was stirred at 100° C. for 3 hours. The resulting solution can be confirmed to be previously condensed by measuring a molecular weight using GPC. Then, 1167 parts of the epoxy resin-bound acrylic resin solution obtained in Synthesis example 20 and 20 parts of dimethylethanol amine were added thereto, and the mixture was stirred at 100° C. for one hour. After cooling to 80° C., 1796 parts of deionized water and 37 parts of dimethylethanol amine were added thereto and the mixture was stirred for 30 minutes, to obtain an aqueous resin composition having a solid component of 30%, a pH of 7.4 and a viscosity of 840 cps.

EXAMPLE 14

In a flask were charged 667 parts of the high acid value acrylic resin solution obtained in Synthesis Example 2 and 80 parts of hexamethoxymethylmelamine, and the mixture was stirred at 100° C. for 3 hours. The resulting solution can be confirmed to be previously condensed by measuring a molecular weight using GPC. Then, 1000 parts of the epoxy resin-bound acrylic resin solution obtained in Synthesis example 21, 76 parts of dimethylethanol amine and 300 parts of deionized water were added thereto, and the mixture was stirred at 80° C. for one hour. Thereafter, 1477 parts of deionized water was added thereto and the mixture was stirred for 30 minutes to obtain an aqueous resin composition having a solid component of 30%, a pH of 7.2 and a viscosity of 1400 cps.

EXAMPLE 15

In a flask were charged 497 parts of the allylated resol type phenol resin-previously condensed high acid value acrylic resin solution obtained in Example 2, 1451 parts of the resol type phenol resin-previously condensed low acid value acrylic resol-bound epoxy resin solution obtained in Example 1, 99 parts of tri(n-butyl)amine and 100 parts of deionized water, and the mixture was stirred at 80° C. for one hour. Thereafter, 1851 parts of deionized water was added thereto and the mixture was stirred for 30 minutes to obtain an aqueous resin composition having a solid component of 30%, a pH of 7.1 and a viscosity of 980 cps.

EXAMPLE 16

In a flask were charged 333 parts of the low acid value acrylic resin solution obtained in Synthetic example 4, 1267 parts of the resol type phenol resin-previously condensed low acid value acrylic resol-bound epoxy resin solution obtained in Example 3 and 10 parts of dimethylethanol amine, and the mixture was stirred at 100° C. for 2 hours and an acid value of the resulting resin was confirmed to be 0.2. Then, to the mixture were added 497 parts of the allylated resol type phenol resin-previously condensed high acid value acrylic resin solution obtained in Example 2, 42 parts of dimethylethanol amine and 200 parts of deionized water, and the mixture was stirred at 100° C. for one hour. Thereafter, 1964 parts of deionized water was added thereto and the mixture was stirred for 30 minutes to obtain an aqueous resin composition having a solid component of 30%, a pH of 7.6 and a viscosity of 1020 cps.

EXAMPLE 17

In a flask were charged 333 parts of the low acid value acrylic resin solution obtained in Synthetic example 4, 1000 parts of the epoxy resin solution obtained in Synthesis example 5, 100 parts of the resol type phenol resin solution obtained in Synthesis Example 7 and 18 parts of tri(n-butyl)amine, and the mixture was stirred at 100° C. for 3 hours. The mixture obtained had an acid value of 0.2 and the resulting solution can be confirmed to be previously condensed by measuring a molecular weight using GPC. Then, 333 parts of the high acid value acrylic resin solution obtained in Synthesis Example 1 was added thereto and the mixture was further stirred at 100° C. for one hour. After cooling to 80° C., 1716 parts of deionized water and 100 parts of tri(n-butyl)amine were added thereto and the mixture was stirred for 30 minutes to obtain an aqueous resin composition having a solid component of 30%, a pH of 8.2 and a viscosity of 850 cps.

EXAMPLE 18

In a flask were charged 1351 parts of the low acid value acrylic resin-bound epoxy resin solution obtained in Comparative example 1 and 100 parts of the resol type phenol resin solution obtained in Synthesis Example 7, and the mixture was stirred at 100° C. for 3 hours. The resulting solution can be confirmed to be previously condensed by measuring a molecular weight using GPC. Then, 333 parts of the high acid value acrylic resin solution obtained in Synthesis Example 1 was added thereto, and the mixture was further stirred at 100° C. for one hour. After cooling to 80° C., 1716 parts of deionized water and 100 parts of tri(n-butyl)amine were added thereto and the mixture was stirred for 30 minutes to obtain an aqueous resin composition having a solid component of 30%, a pH of 7.2 and a viscosity of 1030 cps.

EXAMPLE 19

In a flask were charged 1351 parts of the low acid value acrylic resin-bound epoxy resin solution obtained in Comparative example 1, 100 parts of the resol type phenol resin solution obtained in Synthesis Example 7, 333 parts of high acid value acrylic resin solution obtained in Synthesis example 1 and 18 parts of tri(n-butyl)amine, and the mixture was stirred at 100° C. for 2 hours. After cooling to 80° C., 1716 parts of deionized water and 82 parts of tri(n-butyl)amine were added thereto and the mixture was stirred for 30 minutes to obtain an aqueous resin composition having a solid component of 30%, a pH of 6.8 and a viscosity of 1210 cps.

Using the resins synthesized by the above Synthesis Examples, aqueous resin compositions of the present invention are prepared as mentioned below. Coating films of the aqueous resin compositions are evaluated by the method as mentioned below.

a) Processing resistance

Between test pieces was interposed an aluminum plate having the same thickness with that of the test piece, and the test pieces were tighten with a vise. Then, the degree of cracks at the processing portion of the coating film was judged using a 50-fold magnifying glass.

O: No crack

Δ: Some cracks exist

X: Significant numbers of cracks exist b) Corrosion resistance

A test piece in which the back surface had been sealed with a polyester tape was dipped in a boiled 3% saline solution for one hour, and the corroded degree at the surface of the coating film was judged.

O: No corrosion

Δ: Corrosion slightly occurred

X: Significant corrosion occurred c) Retort resistance

A test piece was treated in a retort sterilizer at 125° C. for 30 minutes and the whitening degree of the coating film was judged.

O: No whitening

Δ: Whitening slightly occurred

X: Significant whitening occurred d) Hot water resistance

A test piece was dipped in a boiled deionized water for one hour to judge the whitening degree of the coating film.

O: No whitening

Δ: Whitening slightly occurred

X: Significant whitening occurred e) Consumed amount of potassium permanganate

In order to evaluate an amount of a dissolved out by water, the following test was carried out.

A both surfaces coated test piece was placed in a pressure bottle made of a glass and after charging therein tap water treated with an activated charcoal so as to become the contact ratio with the coating surface being 1 $cm^2$/1 ml and sealed, it was treated with a retort sterilizer at 125° C. for 30 minutes. Then, the treated solution was measured by the test method described in a food hygiene law of Japan.

O: less than 5 ppm

Δ: 5 to 10 ppm

X: more than 10 ppm f) Flavor maintaining property

A both surfaces coated test piece was placed in a pressure bottle made of a glass and after charging therein tap water treated with an activated charcoal so as to become the contact ratio with the coating surface being 1 $cm^2$/1 ml and sealed, it was treated with a retort sterilizer at 125° C. for 30 minutes. Thereafter, it was stored at 50° C. for 3 months and a functional test was carried out.

O: No change

Δ: Slightly changed

X: Significantly changed g) Adhesiveness

A test piece was cut to a width of 5 mm and a length of 25 cm and the two test pieces were interposed by facing the coating films inside, and a Nylon (trade name) film (available from Dicel Co., polyamide film #7000) having a length of 9 cm was interposed between the coating films. This material was adhered by pressing using a hot press at 200° C. for 40 seconds under a pressure of 5 kg/$cm^2$ to prepare a test piece. This test piece was peeled off (T peel) by Tensilon (trade name, available from Toyo Boldwin Co.) with a tensile rate of 200 mm/min, and the peel strength at that time was made the adhesion strength.

O: more than 3 kg

Δ: 1 to 3 kg

X: less than 1 kg

Experimental Example 1

The composition obtained in Example 1 was coated on one surface of an aluminum plate having a thickness of 0.30 mm with a dried coating amount of 70 mg/$dm^2$ or on both surfaces of an aluminum foil having a thickness of 100 μm with a dried coating amount of 70 mg/$dm^2$, and baked at 250° C. for 30 seconds. Stability of the aqueous resin composition, and adhesiveness, processability, corrosion resistance, retort resistance and hot water resistance of the one surface coated film and a potassium permanganate consumed amount and flavor retaining property of the both surface coated foil were each evaluated according to the test methods as mentioned above. The results are shown in Table 4.

Comparative Experimental 1

In the same manner as in Experimental example 1 except for using the composition obtained in Comparative example 1 in place of the composition obtained in Example 1, samples were prepared. The results are shown in Table 4.

Comparative Experimental Example 2

In the same manner as in Experimental example 1 except for using the composition obtained in Comparative example 2 in place of the composition obtained in Example 1, samples were prepared. The results are shown in Table 4.

Experimental Examples 2 to 12

In the same manner as in Experimental example 1 except for using the composition obtained in any one of Examples 2, 3, 4, 5, 13, 14, 15, 16, 17, 18 and 19, respectively, in place of the composition obtained in Example 1, samples were prepared. The results are shown in Table 4.

Δ: Slightly precipitated
X: Significantly precipitated

TABLE 4

| | Experimental example | | | | | | | | | | | | Comparative experimental example | |
|---|---|---|---|---|---|---|---|---|---|---|---|---|---|---|
| | 1 | 2 | 3 | 4 | 5 | 6 | 7 | 8 | 9 | 10 | 11 | 12 | 1 | 2 |
| Processing resistance | O | O | O | O | O | O | O | O | O | O | O | O | Δ | Δ |
| Corrosion resistance | O | O | O | O | O | O | O | O | O | O | O | O | Δ | O |
| Retort resistance | O | O | O | O | O | O | O | O | O | O | O | O | Δ | O |
| Hot water resistance | O | O | O | O | O | O | O | O | O | O | O | O | Δ | O |
| Potassium permanganate consumed amount | O | O | O | O | O | O | O | O | O | O | O | O | Δ | O |
| Flavor retaining property | O | O | O | O | O | O | O | O | O | O | O | O | Δ | O |

Experimental Examples 13 to 16

In the same manner as in Experimental example 1 except for using the composition obtained in any one of Example 6, 7, 8 or 9 in place of the composition obtained in Example 1, samples were prepared, respectively. The results and stabilities of the aqueous resin compositions are shown in Table 5.

Comparative Experimental Example 3

In the same manner as in Experimental example 1 except for using the composition obtained in Comparative example 3 in place of the composition obtained in Example 1, samples were prepared, respectively. The results and stability of the aqueous resin composition are shown in Table 5.

a) Stability: Each composition was diluted 10-fold with deionized water and after it was allowed to stand for 24 hours, presence or absence of precipitation was observed.
O: No precipitation

TABLE 5

| | Experimental example | | | | Comparative |
|---|---|---|---|---|---|
| | 13 | 14 | 15 | 16 | 3 |
| Aqueous resin composition | Example 6 | Example 7 | Example 8 | Example 9 | Comparative example 3 |
| Stability | O | O | O | O | X |
| Processing resistance | O | O | O | O | Δ |
| Corrosion resistance | O | O | O | O | O |
| Retort resistance | O | O | O | O | O |
| Hot water resistance | O | O | O | O | O |
| Potassium permanganate consumed amount | O | O | O | O | O |
| Flavor retaining property | O | O | O | O | Δ |
| Adhesiveness | O | O | O | O | Δ |

Experimental Examples 17 to 19

In the same manner as in Experimental example 1 except for coating the aqueous resin composition obtained in any one of Example 10, 11 or 12 in place of that obtained in Example 1, test samples were prepared. The results of the evaluation of the coated films and stabilities of the aqueous resin compositions are shown in Table 6.

Comparative Experimental Examples 4 and 5

In the same manner as in Experimental example 1 except for coating the aqueous resin composition obtained in either of Comparative example 4 or 5 in place of that obtained in Example 1, test samples were prepared. The results of the evaluation of the coated films and stabilities of the aqueous resin compositions are shown in Table 6.

TABLE 6

|  | Experimental example | | | Comparative experimental example | |
|---|---|---|---|---|---|
| Aqueous resin composition | 17 Example 10 | 18 Example 11 | 19 Example 12 | 4 Comparative example 4 | 5 Comparative example 5 |
| Stability | O | O | O | X | Δ |
| Processing resistance | O | O | O | Δ | Δ |
| Corrosion resistance | O | O | O | O | Δ |
| Retort resistance | O | O | O | O | O |
| Hot water resistance | O | O | O | O | O |
| Potassium permanganate consumed amount | O | O | O | O | O |
| Flavor retaining property | O | O | O | O | Δ |
| Adhesiveness | O | O | O | Δ | O |

Experimental Example 20

To a #25 tin plate (Temper: T-1) having a thickness of 0.3 mm and defatted with Surfcleaner SN 311 (trade name, an alkaline detergent, available from Nippon Paint Co., Ltd.) was pre-coated the aqueous coatings of Example 1 with a roll coater so as to have a dried film thickness of 2 μm, and the plate was baked at a furnace temperature of 220° C. for 60 seconds.

This plate was DI-processed so as to become the coated surface inside and molded to U.S. can standard 211×414, and then defatted with Surfcleaner SN 311 (as mentioned above).

Then, on the inner surface of the can was subjected to top-coat coating by using the aqueous coatings of Comparative example 2 by spraying so as to the dried coating amount of 80 mg/can, and baked at a furnace temperature of 220° C. for 60 seconds. Coating film properties at the inside of the can were evaluated according to the following test methods and the results are shown in Table 7.

Test Methods (1) Metal exposed degree

Into the coated can was introduced 350 ml of a 1% saline solution containing 0.3% of Aerosol OT-100 (trade name, available from American Cyanamide Co.), and then 6 V of a voltage was applied and a passed current (mA) after 4 seconds was measured.

(2) Corrosion resistance

Into the coated can was introduced 350 ml of a 3% saline solution, and the can was covered by a glass plate and sealed with a commercially available sealant. After allowing to stand at 60° C. for 2 months, corroded state at the inside surface was observed.

O: No corrosion

Δ: Corrosion slightly occurred

X: Significant corrosion occurred

Comparative Experimental Example 6

In the same manner as in Experimental example 20 except for effecting pre-coating of the aqueous coating of Example 1, a coated can was prepared Coating film properties at the inside of the can are shown in Table 7.

Comparative Experimental Example 7

In the same manner as in Experimental example 20 except for pre-coating the aqueous coatings of Comparative example 2 in place of that of Example 1, a coated can was prepared. Coating film properties at the inside of the can are shown in Table 7.

Experimental Example 21

In the same manner as in Experimental example 20 except for pre-coating the aqueous coatings of Example 3 in place of that of Example 1, a coated can was prepared. Coating film properties at the inside of the can are shown in Table 7.

Experimental Example 22

In the same manner as in Experimental example 20 except for pre-coating the aqueous coatings of Synthesis Example 13 in place of that of Example 1, a coated can was prepared. Coating film properties at the inside of the can are shown in Table 7.

Experimental Example 23

In the same manner as in Experimental example 20 except for top-coating the aqueous coatings of Example 1 in place of that of Comparative example 2, a coated can was prepared. Coating film properties at the inside of the can are shown in Table 7.

Experimental Example 24

By using an aluminum plate (3004 H-19) having a thickness of 0.3 mm and after defatting with Surfcleaner 322N-8 (trade name, an alkaline detergent, available from Nippon Paint Co., Ltd.), the plate was subjected to etching with Surfcleaner 420N-2 (trade name, an alkaline etching agent, available from Nippon Paint Co., Ltd.) and subjected to conversion treatment with Alsurf 401/45 (trade name, a chromium phosphate type conversion coatings, available from Nippon Paint Co., Ltd. ). To one surface of the thus treated plate was pre-coated the aqueous coating of Example 13 so as to have a dried film thickness of 1 μm, and the plate was baked at a furnace temperature of 270° C. for 30 seconds.

This plate was DI-processed so as to become the coated surface inside and after molding to U.S. can standard 211× 414, it was defatted with Surfcleaner NHC100 (trade name, an acidic defatting agent, available from Nippon Paint Co., Ltd.) and then subjected to conversion treatment with Alsurf 404 (trade name, a non-chromium type conversion coatings, available from Nippon Paint Co., Ltd.).

Then, on the inner surface of the can was subjected to top-coat coating by using the aqueous coatings of Example 14 by spraying so as to the dried coating amount of 150 mg/can (a film thickness of 3 to 8 μm), and baked at a furnace temperature of 220° C. for 60 seconds. Coating film properties at the inside of the can were evaluated according to the following test methods and the results are shown in Table 7.

Experimental Example 25

To an outside surface of #25 tin plate (Temper: T-1) having a thickness of 0.3 mm and defatted with Surfcleaner SN 311 (as mentioned above) was coated by a roll coater a white paint prepared by dissolving 100 parts of PKHM-301 (trade name, a phenoxy resin, available from Union Carbide Co.) in a mixed solvent of 200 parts of propyleneglycol monomethyl ether and 200 parts of propyleneglycol monomethyl ether acetate, and dispersing therein 80 parts of titanium dioxide according to the conventional method so as to have a dried coating amount of 140 mg/dm$^2$, and the plate was baked at a furnace temperature of 200° C. for 60 seconds.

Then, an inside surface of the plate was pre-coated with the aqueous coatings of Experimental example 20 in the same manner as in Example 1. After DI-processing, a coated can was obtained in the same manner as in Experimental example 20. Coating film properties at the inside of the can were evaluated according to the following test methods and the results are shown in Table 7.

TABLE 7

| Evaluated item | Experimental example | | | | | | Comparative experimental example | |
|---|---|---|---|---|---|---|---|---|
| | 20 | 21 | 22 | 23 | 24 | 25 | 6 | 7 |
| Metal exposed amount (mA) | 0.03 | 0.18 | 0.15 | 0.05 | 0.12 | 0.03 | 20.5 | 31.4 |
| Corrosion resistance | O | O | O | O | O | O | X | X |

The method for forming a coating film on a can body of the present invention uses aqueous coatings for both of the pre-coat and top-coat so that it contributes to prevention of pollution of working environment and global environment. Also, it is no fear of fire, handling of the coating is easy and coating can be done with one top-coating so that it contributes to decrease in production costs of cans. Further, as shown in Examples, corrosion resistance is improved and quality of the cans can be improved.

We claim:

1. An aqueous resin composition comprising
    a base material comprising an acrylic resin (A) and an epoxy resin (B) wherein said resin (A) has an acid value of from greater than 0 to 30, and wherein said resin (B) is partially reacted to said resin (A),
    an acrylic resin (C) having an acid value of from 100 to 500 which is partially bound to said base material or to said resin (B), and
    (D) at least one compound from the group consisting of resol phenol resins and aminoplast resins,
    wherein (A), (B), (C) and (D) are dispersed in an aqueous solution (E) comprising a volatile base.

2. A composition according to claim 1, wherein (D) is previously condensed with at least one of (A), (B), (C) or a bound product thereof.

3. The composition according to claim 1, wherein the acid value of said acrylic resin (A) is from 3 to 30 and wherein the acid value of said acrylic resin (C) is from 120 to 480.

4. The composition according to claim 1, wherein an acid value of the acrylic resin (A) is from 5 to 30 and an acid value of the acrylic resin (C) is from 150 to 350.

5. The composition according to claim 1, wherein said composition further comprises an anti-corrosion pigment.

6. The composition according to claim 1, wherein the weight ratio A:B:C of the solid components of said base material is 1 to 20:90 to 50:9 to 30.

7. The composition according to claim 1, wherein the weight ratio A:B:C of solid components of said base material is 5 to 10:85 to 70:10 to 20.

8. The composition according to claim 2, wherein the weight ratio A:B:C of the solid components of said base material is 1 to 20:90 to 50:9 to 30.

9. The composition according to claim 2, wherein the weight ratio A:B:C of the solid components of said base material is 5 to 10:85 to 70:10 to 20.

10. The composition of claim 2, wherein the acid value of said acrylic resin (A) is from 3 to 30 and the acid value of said acrylic resin (C) is from 120 to 480.

11. The composition of claim 2, wherein the acid value of said acrylic resin (A) is from 5 to 30 and the acid value of the acrylic resin (C) is from 150 to 350.

12. The composition of claim 2, wherein said composition further comprises an anti-corrosion pigment.

13. The composition of claim 2, which comprises a material obtained by reacting
    a previously condensed product of an epoxy resin and one or more compounds selected from the group consisting of resol phenol resins and amino resins, with an acrylic resin having an acid value of from greater than 0 to 30,
    and then partially reacting an acrylic resin having an acid value of from 100 to 500 with said product.

* * * * *